(12) United States Patent
Sawada et al.

(10) Patent No.: US 7,892,442 B2
(45) Date of Patent: Feb. 22, 2011

(54) METHOD OF MANUFACTURING A THIN-FILM MAGNETIC HEAD, THIN-FILM MAGNETIC HEAD MANUFACTURING APPARATUS, AND THIN-FILM MAGNETIC HEAD MANUFACTURING SYSTEM

(75) Inventors: Hiroo Sawada, Tokyo (JP); Jun Shouji, Tokyo (JP); Mitsuhiro Kitao, Tokyo (JP); Eiji Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 1020 days.

(21) Appl. No.: 11/683,611

(22) Filed: Mar. 8, 2007

(65) Prior Publication Data

US 2008/0217287 A1    Sep. 11, 2008

(51) Int. Cl.
 *B44C 1/22*    (2006.01)
(52) U.S. Cl. ............... 216/22; 216/59; 216/60; 216/61; 216/85; 216/86
(58) Field of Classification Search ............ 216/22, 216/59, 60, 61, 84, 85, 86
See application file for complete search history.

(56) References Cited

U.S. PATENT DOCUMENTS

| | | | |
|---|---|---|---|
| 6,546,355 B2 * | 4/2003 | Matsushita | 702/152 |
| 7,312,860 B2 * | 12/2007 | Den Boef et al. | 356/124 |
| 2004/0136113 A1 | 7/2004 | Soeno | |
| 2007/0132157 A1 * | 6/2007 | Tokita et al. | 264/494 |
| 2007/0262268 A1 * | 11/2007 | De Nivelle et al. | 250/492.1 |
| 2008/0030701 A1 * | 2/2008 | Lof | 355/53 |

FOREIGN PATENT DOCUMENTS

| | | |
|---|---|---|
| JP | 2000-105906 | 4/2000 |
| JP | 2004-119753 | 4/2004 |
| JP | 2005-123641 | 5/2005 |

OTHER PUBLICATIONS

English Language Abstract of JP 2004-119753.
English Language Abstract of JP 2005-123641.
English Language Abstract of JP 2000-105906.

* cited by examiner

*Primary Examiner*—Binh X Tran
(74) *Attorney, Agent, or Firm*—Greenblum & Bernstein, P.L.C.

(57) ABSTRACT

A method of manufacturing a thin-film magnetic head works a part to be worked to a target length by carrying out an etching process on an object to be worked using an etching apparatus. The method carries out a measuring process that measures a length before working of a part to be worked using a measuring apparatus and a calculation process that calculates the processing time of the etching process required to work the part to be worked from the length before working to the target length based on a first calculation result correcting parameter obtained in advance corresponding to the measuring apparatus, a second calculation result correcting parameter obtained in advance corresponding to a position of the part to be worked, a third calculation result correcting parameter obtained in advance corresponding to a value of a current supplied to an electrode of the etching apparatus during the etching process, a fourth calculation result correcting parameter obtained in advance corresponding to a total usage time of the electrode, the length before working, and the target length. The etching process is carried out on the object to be worked for the calculated processing time.

16 Claims, 4 Drawing Sheets

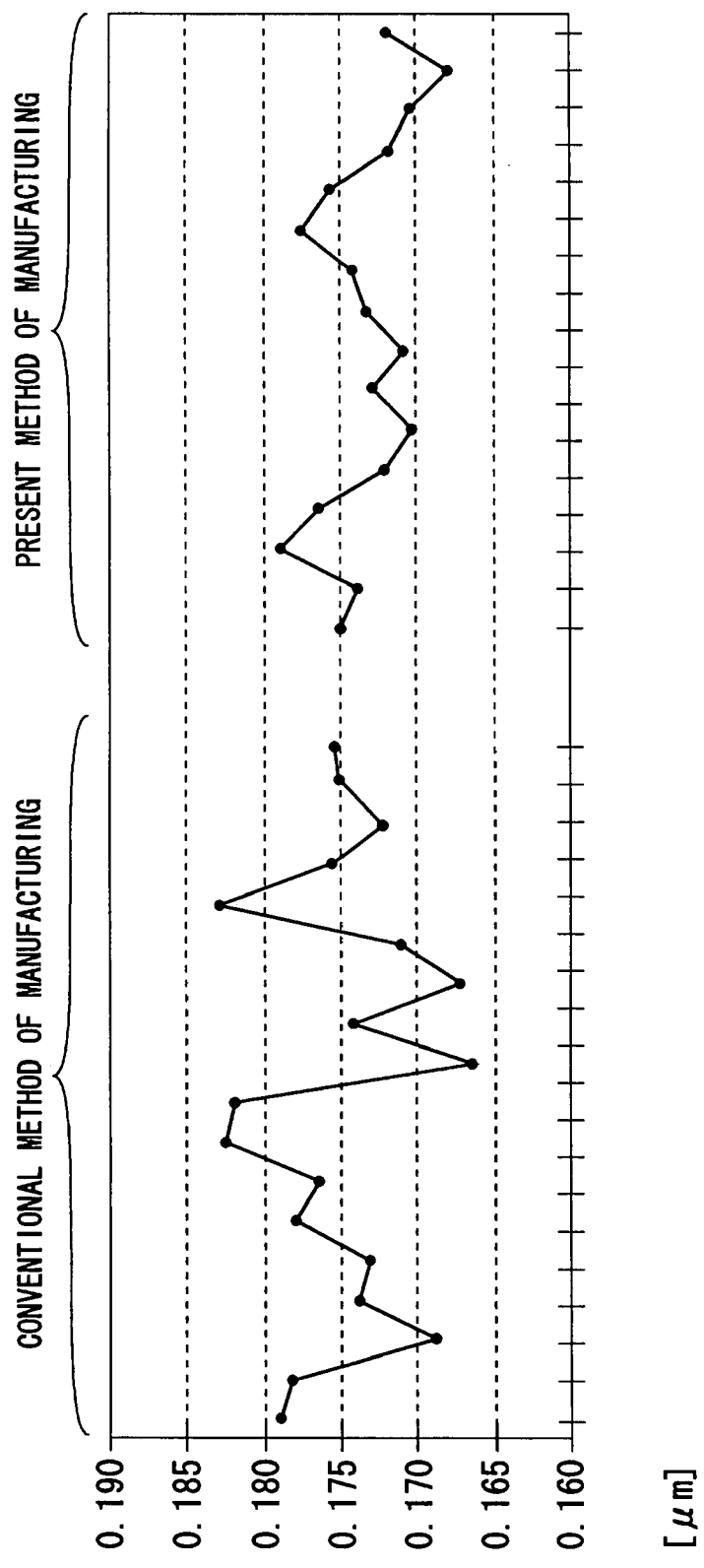
F I G. 6

METHOD OF MANUFACTURING A THIN-FILM MAGNETIC HEAD, THIN-FILM MAGNETIC HEAD MANUFACTURING APPARATUS, AND THIN-FILM MAGNETIC HEAD MANUFACTURING SYSTEM

BACKGROUND OF THE INVENTION

1. Field of the Invention

The present invention relates to a method of manufacturing a thin-film magnetic head, a thin-film magnetic head manufacturing apparatus, and a thin-film magnetic head manufacturing system that manufacture a thin-film magnetic head by carrying out an etching process on an object to be worked to work a part to be worked of the object to be worked to a target length.

2. Description of the Related Art

As one example of this type of method of manufacturing a thin-film magnetic head, in Japanese Laid-Open Patent Publication No. 2000-105906 the present applicant discloses a method of manufacturing a composite thin-film magnetic head including an inductive write element and an MR read element. When manufacturing a thin-film magnetic head according to this method, thin films such as a first magnetic film, a gap film, a coil film, and a coil insulating film are first laminated onto a base according to a well-known process to form a multilayer structure. Next, a photoresist is applied onto the multilayer structure and is patterned to form a resist frame. After this, electroplating or the like is carried out to form a second magnetic film inside a region surrounded by the resist frame. By doing so, a second pole portion is formed on the first magnetic film with the gap film in between. At this stage, the track width of the second pole portion that has been formed is equal to the size of a gap that is provided in the resist frame described above at the formation position of the second pole portion when the resist frame described above was formed.

Since it is difficult to form an extremely narrow gap at the formation position of the second pole portion by photolithography during the formation of the resist frame, it is extremely difficult to form a second pole portion with a sufficiently narrow track width by electroplating using a resist frame. Accordingly, to stabilize the magnetic characteristics and to improve the recording performance, the applicant has started reducing the track width of (i.e., narrowing) the second pole portion using the following method. More specifically, after the resist frame has been removed from the multilayer structure, a dry etching process is carried out on the second pole portion for a predetermined processing time. By doing so, it is possible to reduce the track width of the second pole portion to 1.0 μm or below (for example, around 0.8 μm). After this, by forming a protective film and the like by a well-known process so as to cover the second pole portion and the like, the thin-film magnetic head is completed.

In this way, when dry etching is carried out to narrow a second pole portion that has been formed by electroplating using a resist frame, as one example, the processing time of the dry etching required to reduce the second pole portion to the desired track width is set based on information obtained during a manufacturing process that produced samples or during a manufacturing process for products carried out before the present process. More specifically, the track width of the second pole portion formed by electroplating (hereinafter referred to as the "length before working"), the track width of the second pole portion that has been narrowed by dry etching (hereinafter, referred to as the "length after working"), and the processing time of the dry etching process are obtained and the etching rate during the etching process on the second pole portion (the second magnetic film) is calculated based on such information. During the manufacturing of a product, the length before working of a second pole portion formed by electroplating is measured and the processing time required to work the second pole portion to the target length is calculated based on the etching rate obtained in advance. By doing so, a second pole portion with the desired length (the target length) is formed by carrying out the dry etching process for the calculated processing time.

SUMMARY OF THE INVENTION

On the other hand, the present inventor found the following issue with the conventional method of manufacturing a thin-film magnetic head. With a method that calculates the processing time of the dry etching process based on an etching rate obtained in advance as described above, it is difficult in reality to form the length of the second pole portion at the target length due to changes in the measurement environment in which the length before working is measured and in the working environment in which the dry etching process is carried out. For example, the discharge characteristics of the electrode of the etching apparatus that carries out the dry etching process change in accordance with how long the electrode has been used. Also, when a predetermined voltage is applied to the electrode of the etching apparatus during the etching process, there will be (extremely small) fluctuations in the value of the current supplied to the electrode in accordance with whether the electrode has deteriorated, the operating state of the power supply apparatus, and the supply state of the commercial AC power supplied to the power supply apparatus. Due to such fluctuations, the etching performance of the etching apparatus will also fluctuate. This means that even if the processing time is calculated based on an etching rate obtained before a thin-film magnetic head is manufactured, the etching rate on the second pole portion (i.e., the second magnetic film) will differ for the working environment used at the time when the thin-film magnetic head is actually manufactured, thereby making it difficult to work the second pole portion to the desired (i.e., target) length. This means that there is the issue that it is difficult to work the length of the part to be worked (in this example, the second pole portion) to the target length with the conventional method of manufacturing a thin-film magnetic head.

The present invention was conceived to solve the issue described above and it is a principal object of the present invention to provide a method of manufacturing a thin-film magnetic head, a thin-film magnetic head manufacturing apparatus, and a thin-film magnetic head manufacturing system that can work the length of a part to be worked to a target length.

To achieve the stated object a method of manufacturing a thin-film magnetic head according to the present invention works a part to be worked to a target length by carrying out an etching process on an object to be worked using an etching apparatus, the method of manufacturing including: a measuring process that measures a length before working of a part to be worked using a measuring apparatus; and a calculation process that calculates a processing time of the etching process required to work the part to be worked from a length before working to the target length based on a first calculation result correcting parameter obtained in advance corresponding to the measuring apparatus, a second calculation result correcting parameter obtained in advance corresponding to a position of the part to be worked, a third calculation result correcting parameter obtained in advance corresponding to a value of a current supplied to an electrode of the etching apparatus during the etching process, a fourth calculation result correcting parameter obtained in advance corresponding to a total usage time of the electrode, the length before working, and the target length, wherein the etching process is carried out on the object to be worked for the calculated processing time.

A thin-film magnetic head manufacturing apparatus according to the present invention includes: an etching process unit that carries out an etching process on an object to be worked; a calculation process unit that carries out a calculation process for calculating a processing time of the etching process; and a control unit that controls the etching process unit based on a calculation result of the calculation process unit, wherein a thin-film magnetic head is manufactured by working a part to be worked of the object to be worked to a target length by having the object to be worked subjected to the etching process by the etching process unit, during the calculation process the calculation process unit calculates the processing time of the etching process required to work the part to be worked from a length before working to the target length based on a first calculation result correcting parameter obtained in advance corresponding to a measuring apparatus that measured the length before working of the part to be worked, a second calculation result correcting parameter obtained in advance corresponding to a position of the part to be worked, a third calculation result correcting parameter obtained in advance corresponding to a value of a current supplied to an electrode of the etching process unit during the etching process, a fourth calculation result correcting parameter obtained in advance corresponding to a total usage time of the electrode, the length before working measured by the measurement apparatus, and the target length, and the control unit controls the etching process unit to have the etching process unit carry out the etching process for the processing time calculated by the calculation process unit.

A thin-film magnetic head manufacturing system according to the present invention manufactures a thin-film magnetic head and includes: the thin-film magnetic head manufacturing apparatus described above; and the measuring apparatus.

Note that the expression "target length" in this specification includes both a target length in a planar direction (e.g., width) of the part to be worked and a target length in a thickness direction (i.e., thickness) of the part to be worked.

In this way, according to the above method of manufacturing a thin-film magnetic head, thin-film magnetic head manufacturing apparatus, and thin-film magnetic head manufacturing system, the calculation process for calculating the processing time required to work the part to be worked to the target length is carried out based on the first calculation result correcting parameter that is obtained in advance corresponding to the measuring apparatus, the second calculation result correcting parameter that is obtained in advance corresponding to the position of the part to be worked, the third calculation result correcting parameter that is obtained in advance corresponding to the value of the current supplied to the electrode during the etching process, the fourth calculation result correcting parameter that is obtained in advance corresponding to the total usage time of the electrode, the length before working, and the target length, and the thin-film magnetic head is manufactured by carrying out the etching process on the object to be worked for the calculated processing time. This means that according to the above method of manufacturing a thin-film magnetic head, thin-film magnetic head manufacturing apparatus, and thin-film magnetic head manufacturing system, unlike the conventional method of manufacturing a thin-film magnetic head that calculates the processing time required to work the second pole portion to the target length based on the etching rate during the most recent etching process, it is possible to carry out an etching process on the object to be worked by calculating a suitable processing time in accordance with changes in the working environment due to differences in the total usage time of the electrode, changes in the working environment due to fluctuations in the supply state of the commercial AC power supplied to the etching apparatus, and the like. As a result, according to the above method of manufacturing a thin-film magnetic head, thin-film magnetic head manufacturing apparatus, and thin-film magnetic head manufacturing system, it is possible to manufacture a thin-film magnetic head where the length of the part to be worked after working is subject to significantly less fluctuation.

Also, with the method of manufacturing a thin-film magnetic head according to the present invention, when the length before working has been measured during the measuring process using a predetermined measuring apparatus out of a plurality of the measuring apparatuses, the processing time may be calculated during the calculation process using a first calculation result correcting parameter corresponding to the predetermined measuring apparatus out of a plurality of the first calculation result correcting parameters that are obtained in advance for the plurality of the measuring apparatuses.

Similarly, the thin-film magnetic head manufacturing apparatus according to the present invention may further include a storage unit that stores a plurality of first calculation result correcting parameters obtained in advance for a plurality of the measuring apparatuses, wherein during the calculation process, the calculation process unit may calculate the processing time using a first calculation result correcting parameter corresponding to a predetermined measuring apparatus that measured the length before working out of the plurality of the first calculation result correcting parameters.

Another thin-film magnetic head manufacturing system according to the present invention manufactures a thin-film magnetic head and includes: the thin-film magnetic head manufacturing apparatus described above; and the plurality of measuring apparatuses.

According to the above method of manufacturing a thin-film magnetic head, thin-film magnetic head manufacturing apparatus, and thin-film magnetic head manufacturing system, during the calculation process, the processing time is calculated using a first calculation result correcting parameter corresponding to a predetermined measuring apparatus out of the plurality of first calculation result correcting parameters obtained in advance for a plurality of measuring apparatuses. Therefore, according to the above method of manufacturing a thin-film magnetic head, thin-film magnetic head manufacturing apparatus, and thin-film magnetic head manufacturing system, even if the measuring process is carried out in parallel using a plurality of measuring apparatuses, it will still be possible to correct errors in the calculation results due to measurement errors for the respective measuring apparatuses. Accordingly, an appropriate processing time can be calculated. Therefore, according to the above method of manufacturing a thin-film magnetic head, thin-film magnetic head manufacturing apparatus, and thin-film magnetic head manufacturing system, compared to a construction and method where the length before working is successively measured for a plurality of objects to be worked using a single measuring apparatus, it is possible to avoid a situation where there is a drop in the productivity due to the measuring process for the length before working forming a bottleneck in the series of manufacturing processes and possible to manufacture a thin-film magnetic head including a part to be worked whose length after working is subject to significantly less fluctuation regardless of which measuring apparatus measured the length before working.

Also, with the method of manufacturing a thin-film magnetic head according to the present invention, when the length before working has been measured during the measuring process for a predetermined part to be worked out of a plurality of the parts to be worked, the processing time may be calculated during the calculation process using a second calculation result correcting parameter corresponding to the predetermined part to be worked out of a plurality of the second calculation result correcting parameters that are obtained in advance for the plurality of the parts to be worked.

Similarly, the thin-film magnetic head manufacturing apparatus according to the present invention may further include a storage unit that stores a plurality of second calculation result correcting parameters obtained in advance for a plurality of the parts to be worked, wherein during the calculation process, the calculation process unit may calculate the processing time using a second calculation result correcting parameter corresponding to a predetermined part to be worked for which the length before working was measured out of the plurality of the second calculation result correcting parameters.

According to the above method of manufacturing a thin-film magnetic head and thin-film magnetic head manufacturing apparatus, during the calculation process, the processing time is calculated using the second calculation result correcting parameter corresponding to a predetermined part to be worked out of the plurality of second calculation result correcting parameters obtained in advance for a plurality of parts to be worked. Therefore, according to the above method of manufacturing a thin-film magnetic head and thin-film magnetic head manufacturing apparatus, unlike the case where only one standard position for measuring the length before working is set for each object to be worked, for example, even if the length before working at a first position is difficult to measure and the length before working is measured at another measurement position (for example, a second position), it will still be possible to carry out the etching process on the object to be worked having calculated an appropriate processing time in accordance with fluctuations in the measured value due to differences in the measurement position. As a result, according to the above method of manufacturing a thin-film magnetic head and thin-film magnetic head manufacturing apparatus according to the present invention, it is possible to manufacture a thin-film magnetic head with a part to be worked whose length after working is subject to significantly less fluctuation.

Also, with the method of manufacturing a thin-film magnetic head according to the present invention, when the part to be worked has been formed of a predetermined material out of a plurality of types of material, the processing time may be calculated during the calculation process using a fifth calculation result correcting parameter corresponding to the predetermined material out of a plurality of the fifth calculation result correcting parameters that are obtained in advance for the plurality of types of material.

Similarly, the thin-film magnetic head manufacturing apparatus according to the present invention may further include a storage unit that stores a plurality of fifth calculation result correcting parameters obtained in advance for a plurality of types of material that form the part to be worked, wherein during the calculation process, the calculation process unit may calculate the processing time using a fifth calculation result correcting parameter corresponding to a predetermined material that forms the part to be worked out of the plurality of fifth calculation result correcting parameters.

According to the above method of manufacturing a thin-film magnetic head and thin-film magnetic head manufacturing apparatus, during the calculation process, the processing time is calculated using the fifth calculation result correcting parameter corresponding to a predetermined material that forms the part to be worked out of a plurality of fifth calculation result correcting parameters obtained in advance for a plurality of types of material. Therefore, according to the above method of manufacturing a thin-film magnetic head and thin-film magnetic head manufacturing apparatus, even when a plurality of types of the predetermined material described above are present, it will be possible to carry out the etching process on the object to be worked having calculated an appropriate processing time for each material. As a result, according to the above method of manufacturing a thin-film magnetic head and thin-film magnetic head manufacturing apparatus, it is possible to manufacture various types of thin-film magnetic heads of different materials where the part to be worked is formed with a length after working subject to significantly less fluctuation.

Also, with the method of manufacturing a thin-film magnetic head according to the present invention, when the part to be worked is worked to a predetermined worked shape out of a plurality of types of worked shape during the etching process, the processing time may be calculated during the calculation process using a sixth calculation result correcting parameter corresponding to the predetermined worked shape out of a plurality of the sixth calculation result correcting parameters that are obtained in advance for the plurality of types of worked shape.

Similarly, the thin-film magnetic head manufacturing apparatus according to the present invention may further include a storage unit that stores a plurality of sixth calculation result correcting parameters obtained in advance for a plurality of types of worked shape to which the part to be worked is to be worked, wherein during the calculation process, the calculation process unit may calculate the processing time using a sixth calculation result correcting parameter corresponding to a predetermined worked shape out of the plurality of sixth calculation result correcting parameters.

Note that the expression "worked shape" in this specification refers to the shape of a predetermined part of the part to be worked after working. Accordingly, the expression "plurality of sixth calculation result correcting parameters obtained in advance for a plurality of types of worked shape" refers to a plurality of parameters corresponding to shapes where the length (i.e., width, height, thickness, etc.) and/or angle of the predetermined part after working differs.

According to the above method of manufacturing a thin-film magnetic head and thin-film magnetic head manufacturing apparatus, during the calculation process, the processing time is calculated using a sixth calculation result correcting parameter corresponding to a predetermined worked shape for the part to be worked out of a plurality of sixth calculation result correcting parameters obtained in advance for a plurality of types of worked shapes. Therefore, according to the above method of manufacturing a thin-film magnetic head and thin-film magnetic head manufacturing apparatus, it is possible to carry out the etching process on the object to be worked having calculated the appropriate processing time for the worked shape, even when there are a plurality of types of worked shapes. As a result, according to the above method of manufacturing a thin-film magnetic head and thin-film magnetic head manufacturing apparatus, it is possible to manufacture various types of thin-film magnetic heads having parts to be worked of different shapes, but where the parts to be worked are formed with a length after working that is subject to significantly less fluctuation.

BRIEF DESCRIPTION OF THE DRAWINGS

These and other objects and features of the present invention will be explained in more detail below with reference to the attached drawings, wherein:

FIG. 6 is a diagram useful in explaining the fluctuations in the length of the pole portion for thin-film magnetic heads manufactured according to the method of manufacturing a thin-film magnetic head according to the present invention and for thin-film magnetic heads manufactured according to the conventional method of manufacturing a thin-film magnetic head.

DESCRIPTION OF THE PREFERRED EMBODIMENTS

Preferred embodiments of a method of manufacturing a thin-film magnetic head, a thin-film magnetic head manufacturing apparatus, and a thin-film magnetic head manufacturing system according to the present invention will now be described with reference to the attached drawings.

Figure 1:
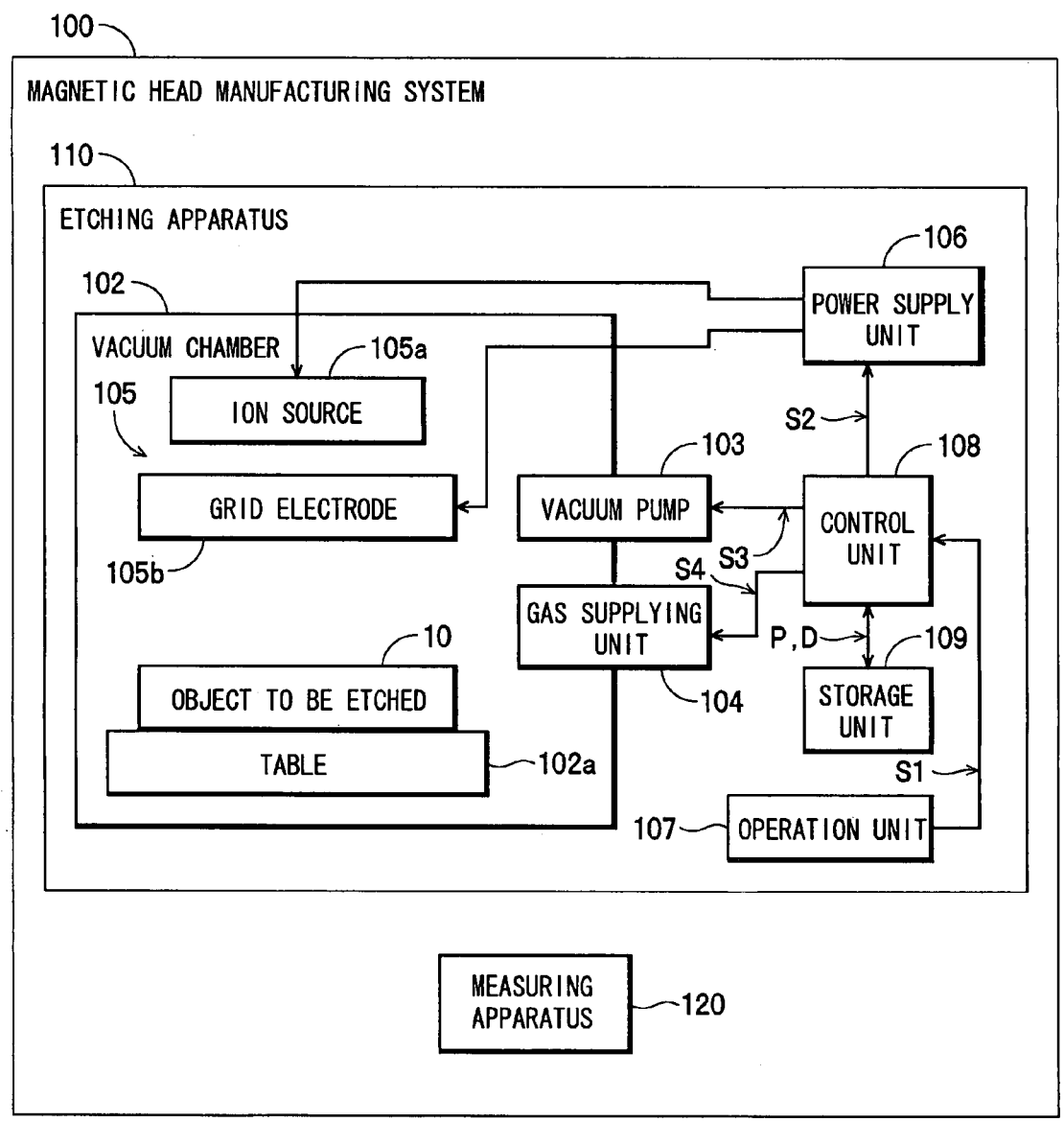
FIG. 1 is a block diagram showing the construction of a magnetic head manufacturing system.
Figure 2:
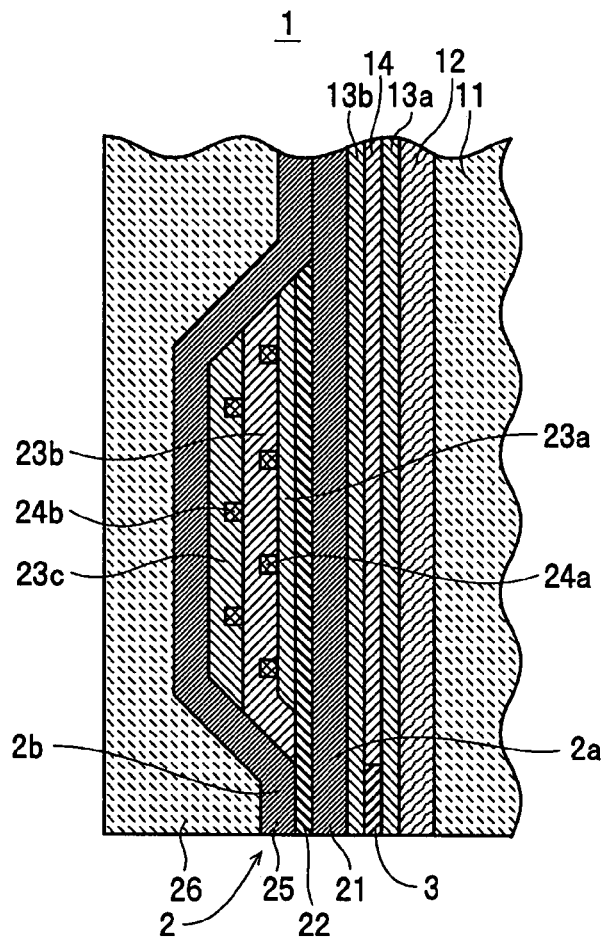
FIG. 2 is a cross-sectional view showing the construction of a thin-film magnetic head.

The magnetic head manufacturing system 100 shown in FIG. 1 is one example of a "thin-film magnetic head manufacturing system" according to the present invention, includes an etching apparatus 110 that corresponds to a "thin-film magnetic head manufacturing apparatus" according to the present invention and a measuring apparatus 120 corresponding to a "measuring apparatus" for the present invention, and is constructed so as to be capable of manufacturing a thin-film magnetic head 1 shown in FIG. 2 in accordance with the "method of manufacturing the thin-film magnetic head" according to the present invention. Note that although one etching apparatus 110 and one measuring apparatus 120 are shown in FIG. 1, in reality the magnetic head manufacturing system 100 includes a plurality of (for example, three) etching apparatuses 110 and a plurality of (for example, four) measuring apparatuses 120.

Here, as shown in FIG. 2, the thin-film magnetic head 1 is one example of a composite thin-film magnetic head including a write element 2 and a read element 3, and is constructed by laminating various types of thin films such as a shield film 12, insulating films 13a, 13b, a lead conductor 14, a first magnetic film 21, a gap film 22, coil insulating films 23a to 23c, coil films 24a, 24b, a second magnetic film 25, and a protective film 26 on a base 11. Here, in the thin-film magnetic head 1, a first pole portion 2a is constructed by the first magnetic film 21 and a second pole portion 2b is constructed by the second magnetic film 25. Note that since the fundamental construction of the thin-film magnetic head 1 is the same as a thin-film magnetic head disclosed by the present applicant in Japanese Laid-Open Patent Publication No. 2000-105906 described earlier, detailed description thereof is omitted here.

On the other hand, as shown in FIG. 1, the etching apparatus 110 includes a vacuum chamber 102, a vacuum pump 103, a gas supplying unit 104, an ion gun 105, a power supply unit 106, an operation unit 107, a control unit 108, and a storage unit 109. The vacuum chamber 102 is constructed so as to be capable of housing a table 102a, on which an object to be etched 10 (described later) can be placed, the ion gun 105, and the like. The vacuum pump 103 evacuates air from inside the vacuum chamber 102 in accordance with a control signal S3 from the control unit 108 to maintain a vacuum inside the vacuum chamber 102. The gas supplying unit 104 supplies various types of inert gas (for example, argon gas) inside the vacuum chamber 102 in accordance with a control signal S4 from the control unit 108.

The ion gun 105 includes an ion source 105a, a grid electrode 105b, and a neutralizer (not shown) and is constructed so as to be capable of emitting ionized argon toward the object to be etched 10. Here, the ion source 105a includes a cathode coil, an anode electrode, a magnet, and the like (none of which are shown), is housed inside the vacuum chamber 102 together with the grid electrode 105b, and is electrically connected to the power supply unit 106. The grid electrode 105b is one example of an "electrode" for the present invention and is electrically connected to the power supply unit 106. The power supply unit 106 supplies a current of a predetermined value by applying a preset voltage to the ion source 105a and the grid electrode 105b in accordance with a control signal S2 from the control unit 108. Note that although the power supply unit 106 is constructed in reality of various types of power supply such as a magnet power supply, a cathode power supply, a discharge power supply, a beam power supply, an accelerator power supply, and a neutralizer power supply, for ease of understanding the present invention such components are collectively referred to as the "power supply unit 106". The operation unit 107 includes various types of operation switches for making setting operations for processing conditions of the etching process carried out by the etching apparatus 110, and outputs an operation signal S1 in accordance with an operation of such switches to the control unit 108.

The control unit 108 corresponds to a "control unit" for the present invention and carries out overall control over the etching apparatus 110. More specifically, as described later, the control unit 108 controls the vacuum pump 103, the gas supplying unit 104, and the power supply unit 106 to carry out an etching process on the object to be etched 10 in accordance with the method of manufacturing a thin-film magnetic head according to the present invention and thereby work the second pole portion 2b to the target length. The control unit 108 constructs a "calculation process unit" for the present invention and as described later calculates an etching processing time required to work the second pole portion 2b to the target length based on various parameters and distance information. The storage unit 109 stores an operation program (an etching process program P) of the control unit 108 and calculation process data D in which various parameters and the like for the present invention are recorded. Note that as described later, every time the etching process is carried out by the etching apparatus 110, the calculation process data D in the storage unit 109 is updated to new calculation process data D that reflects the processing content of such etching process by an updating process carried out by the control unit 108.

Figure 3:
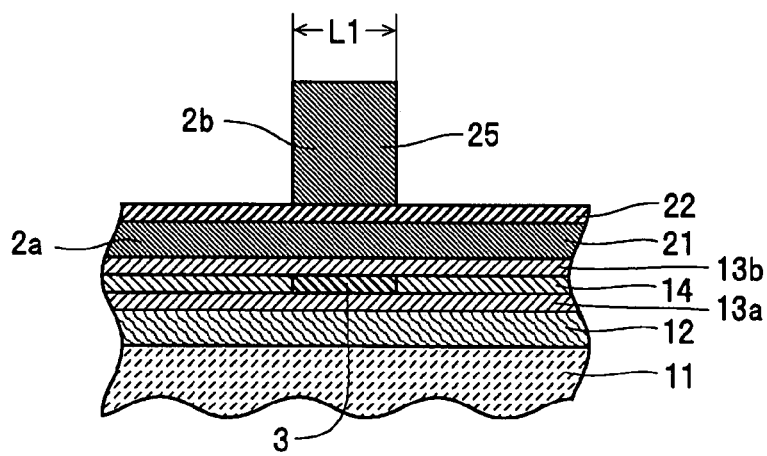
FIG. 3 is a cross-sectional view showing a state where a second pole portion has been formed on a gap film by electroplating.

As one example, the measuring apparatus 120 is constructed of an FIB apparatus (a focused ion beam working observing apparatus) and as described later, a measuring process that measures the length L1 of a second pole portion 2b (one example of the "length before working" of the part to be worked for the present invention: see FIG. 3) is carried out for a thin-film magnetic head 1 at a predetermined position out of a large number of thin-film magnetic heads 1 (for example, 10,000 thin-film magnetic heads 1) formed on a single base 11 (as one example, a silicon wafer). Note that to measure the length L1 using the measuring apparatus 120, either of a construction where the measuring apparatus 120 is manually operated by the operator or a construction where the measuring apparatus 120 is automatically operated under control by the control unit 108 of the etching apparatus 110 may be used.

When forming a thin film using the magnetic head manufacturing system 100, first, in the same way as the conventional method of manufacturing a thin-film magnetic head, a multilayer structure (not shown) where thin films such as the shield film 12, the insulating films 13a, 13b, the lead conductor 14, the first magnetic film 21, the gap film 22, the coil insulating films 23a to 23c, the coil films 24a, 24b are formed on the base 11 is formed in accordance with a well. known process. Next, a photoresist is applied onto the multilayer structure and patterned to form a resist frame (not shown). After this, electroplating or the like is carried out to form the second magnetic film 25 inside the region surrounded by the resist frame. By doing so, the second pole portion 2b is formed by the second magnetic film 25 so as to cover the gap film 22, the coil insulating films 23a to 23c, and the like. When doing so, the plated film (the second magnetic film 25) adhering to an outer region of the resist frame is removed by dry etching, for example. At this point, as shown in FIG. 3, the length L1 (i.e., the track width) of the formed second pole portion 2b is equal to the size of a gap (i.e., the width of "the region surrounded by the resist frame" described above) provided in the resist frame described above at the formation position of the second pole portion 2b when the resist frame was formed.

Next, by removing the resist frame, the object to be etched 10 (one example of a "object to be worked" for the present invention is formed. After this, the length L1 (i.e., the "length before working" for the present invention) of the second pole portion 2b of the object to be etched 10 is measured using the measuring apparatus 120 (i.e., the "measuring process" for the present invention is carried out). More specifically, the object to be etched 10 (i.e., multilayer structure) on which the 10,000 thin-film magnetic heads 1 (the second pole portions 2b) have been formed is set in the measuring apparatus 120. When doing so, as one example, the object to be etched 10 is set into a first measuring apparatus out of the four measuring apparatuses 120. Here, the four measuring apparatuses 120 each produce an extremely small measurement error. Accordingly, with the magnetic head manufacturing system 100, four calculation result correcting parameters for correcting the measurement errors produced between the four measuring apparatuses 120 (i.e., "first calculation result correcting parameters" for the present invention) are stored corresponding to the respective measuring apparatuses 120 in the storage unit 109 of each etching apparatus 110 as the calculation process data D.

More specifically, as examples, the coefficient "0.0000" is stored in the calculation process data D as a "calculation result correcting parameter corresponding to the first measuring apparatus 120" and the coefficient "0.0020" is stored as a "calculation result correcting parameter corresponding to the second measuring apparatus 120". Similarly, the coefficient "0.0034" is stored in the calculation process data D as a "calculation result correcting parameter corresponding to the third measuring apparatus 120" and the coefficient "−0.0002"
is stored as a "calculation result correcting parameter corresponding to the fourth measuring apparatus 120".

Next, the measuring apparatus 120 is operated and the length L1 is measured for a thin-film magnetic head 1 formed at a predetermined position out of the 10,000 thin-film magnetic heads 1 on the object to be etched 10 (in this example, as one example, the thin-film magnetic head 1 formed at a second position out of two standard positions). When doing so, as one example, a length of 0.332 μm is measured. Here, at the formation positions of each thin-film magnetic head 1 on the object to be etched 10 (i.e., at the "parts to be worked" for the present invention), the length L1 of the second pole portion 2b will very slightly differ due to differences in the formation conditions for the thin films, in the formation conditions for the resist frame described earlier, and the like. Accordingly, with the magnetic head manufacturing system 100, two calculation result correcting parameters for correcting differences in the calculation results due to differences in the length L1 between the two standard positions (i.e., two "second calculation result correcting parameters" for the present invention) are stored in the storage unit 109 of the etching apparatus 110 corresponding to such standard positions as the calculation process data D.

More specifically, the coefficient "0.0000" is stored for example as the "calculation result correcting parameter corresponding to the first position" in the calculation process data D and the coefficient "0.0012" is stored for example as the "calculation result correcting parameter corresponding to the second position". Note that the calculation result correcting parameters described above are obtained by a least square calculation, maximum likelihood estimation, or the like.

Next, a calculation process that calculates the processing time required by an etching process that narrows the second pole portion 2b using the etching apparatus 110 is carried out. More specifically, as one example, by operating the operation unit 107 of a first apparatus out of the three etching apparatuses 110, the length L1 measured by the measuring apparatus 120 (in this example, 0.332 μm), the apparatus number of the measuring apparatus 120 used in the measuring process (in this example, the first apparatus), and the measurement position at which the length L1 was measured (in this example, the second position) are set. Here, in the etching apparatus 110, the final length L2 of the second pole portion 2b after working by the etching process (narrowing process) (i.e., the "target length" for the present invention: see FIG. 4) is set at 0.250 μm. Accordingly, based on the inputted length L1 (in this example, 0.332 μm) and the length L2 that is the target length (in this example, 0.250 μm), the control unit 108 calculates the length to be etched by the etching process, described later, (i.e., length L1−length L2: hereinafter referred to as the "trim amount") as 0.082 μm.

With the etching apparatus 110, as described earlier, the calculation process data D that reflects (i.e., has been updated to show) the processing content of an etching process previously carried out is stored in the storage unit 109. Here, in the first etching apparatus 110, as one example, 6,000 seconds is stored as the total usage time of the grid electrode 105b and 30.0 mA is stored as the value of the current supplied from the power supply unit 106 to the grid electrode 105b during the most recent etching process. Note that as one example, the value (for example, 30.0 mA) of the current supplied to the grid electrode 105b is calculated based on the voltage applied to the grid electrode 105b during the most recent etching process and the resistance of each grid electrode 105b of the etching apparatuses 110 and is stored in the storage unit 109 as the calculation process data D.

In the etching apparatus 110, an etching process program P that is capable of an etching process on two types of object to be etched 10 where the second magnetic film 25 that constructs the second pole portion 2b is made of different materials is also stored in the storage unit 109. Here, since the etching rate during the etching process, described later, will differ due to the difference in the materials of the second magnetic film 25, in the magnetic head manufacturing system 100 two calculation result correcting parameters for correcting the differences in the etching rate for the two types of material (i.e., "fifth calculation result correcting parameters" for the present invention) are stored corresponding to the respective materials in the storage unit 109 of each etching apparatus 110 as the calculation process data D. More specifically, the coefficient "0.0000" is stored as one example of the "calculation result correcting parameter corresponding to the first material" in the calculation process data D and the coefficient "−0.0026" is stored as one example of the "calculation result correcting parameter corresponding to the second material". Note that in this example, the second material is used as the second magnetic film 25 described above.

Also, in the etching apparatus 110, an etching process program P that is capable of manufacturing various types of thin-film magnetic head 1 heads 1 where the shape of the first pole portion 2a differs is also stored in the storage unit 109.

Figure 5:
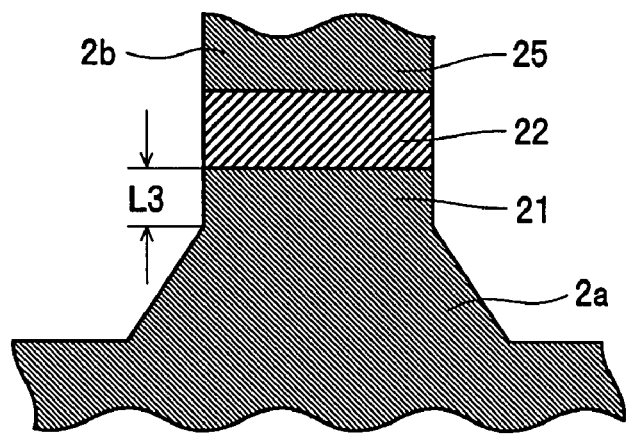
FIG. 5 is another cross-sectional view showing a state where the second pole portion has been narrowed by an etching process.

More specifically, as shown in FIG. 5, in this type of thin-film magnetic head 1, the first pole portion 2a is formed so that the width (the length in the left-right direction in FIG. 5) of a base 11 side thereof (the lower side in FIG. 5) gradually increases toward the base 11. Here, since the characteristics of the write element 2 differ according to differences in the length (i.e., the length L3 in FIG. 5) in a gap direction (i.e., the up-down direction in FIG. 5) of a part formed so as to have the same width (i.e., the width in the left-right direction in FIG. 5) as the second pole portion 2b or the like, the length L3 to be formed during the manufacturing of the thin-film magnetic head 1 (one example of a difference in "worked shape" for the present invention) is important. Accordingly, the length L3 described above in the thin-film magnetic head 1 formed by the etching process described later is set by operating the operation unit 107. When doing so, the length L3 is set at 0.3 μm, for example (one example of a "sixth calculation result correcting parameter" for the present invention).

Next, the control unit 108 substitutes the calculation result correcting parameters described above and the respective lengths L1 to L3 into "Equation 1" below in accordance with the etching process program P to calculate the processing time required to work the second pole portion 2b from the length L1 to the length L2.

EQUATION 1

$$\left\{ 0.0159 + \begin{pmatrix} \text{CALCULATION RESULT} \\ \text{CORRECTING PARAMETER} \\ \text{CORRESPONDING TO THE} \\ \text{MEASUREMENT APPARATUS} \end{pmatrix} \begin{pmatrix} = 0.0000 \; \text{FOR MEASUREMENT BY FIRST APPARATUS} \\ = 0.0020 \; \text{FOR MEASUREMENT BY SECOND APPARATUS} \\ = 0.0034 \; \text{FOR MEASUREMENT BY THIRD APPARATUS} \\ = -0.0002 \; \text{FOR MEASUREMENT BY FOURTH APPARATUS} \end{pmatrix} - \right.$$

$$\left. \frac{\begin{pmatrix} \text{CALCULATION RESULT CORRECTING PARAMETER} \\ \text{CORRESPONDING TO THE TOTAL USAGE TIME OF} \\ \text{THE GRID ELECTRODE} (0.00000162 \times \text{GRID USAGE TIME (SECONDS)}) + \\ \text{CALCULATION RESULT CORRECTING PARAMETER} \\ \text{CORRESPONDING TO THE VALUE OF THE} \\ \text{CURRENT SUPPLIED } (0.00032 \times \text{GRID CURRENT (mA)}) + \\ \text{CALCULATION RESULT CORRECTING PARAMETER} \\ \text{CORRESPONDING TO THE ETCHING APPARATUS} \begin{pmatrix} = 0.0000 \; \text{FOR ETCHING BY FIRST APPARATUS} \\ = 0.0020 \; \text{FOR ETCHING BY SECOND APPARATUS} \\ = -0.0487 \; \text{FOR ETCHING BY THIRD APPARATUS} \end{pmatrix} + \\ \text{CALCULATION RESULT CORRECTING} \\ \text{PARAMETER CORRESPONDING TO THE} \\ \text{MATERIAL} \begin{pmatrix} = 0.0000 \; \text{FOR FIRST MATERIAL} \\ = -0.0026 \; \text{FOR SECOND MATERIAL} \end{pmatrix} + \\ \text{CALCULATION RESULT CORRECTING PARAMETER} \\ \text{CORRESPONDING TO THE} \\ \text{DIFFERENCE IN WORKED SHAPE} \\ (0.0024 \times \text{LENGTH } L3 \; (\text{VALUE CORRESPONDING TO WORKED SHAPE})) \end{pmatrix}}{\begin{pmatrix} 0.00072 + \text{CALCULATION RESULT CORRECTING PARAMETER} \\ \text{CORRESPONDING TO THE ETCHING APPARATUS} \\ \begin{pmatrix} = 0.00000 \; \text{FOR ETCHING BY FIRST APPARATUS} \\ = 0.00001 \; \text{FOR ETCHING BY SECOND APPARATUS} \\ = 0.00005 \; \text{FOR ETCHING BY THIRD APPARATUS} \end{pmatrix} \end{pmatrix}} \right\} + \begin{pmatrix} \text{TRIM} \\ \text{AMOUNT} \\ \text{LENGTH} \\ L1\text{-}L2 \end{pmatrix}$$

More specifically, the control unit 108 substitutes "0.0000" as the calculation result correcting parameter corresponding to the measuring apparatus 120 (in this example, the first apparatus), substitutes "0.00972 (=0.00000162×6000)" as the calculation result correcting parameter corresponding to the total usage time of the grid electrode 105b (the "fourth calculation result correcting parameter" for the present invention), substitutes "0.0096 (=0.00032×30)" as the calculation result correcting parameter corresponding to the value of the current supplied to the grid electrode 105b (the "third calculation result correcting parameter" for the present invention), substitutes "0.0000" as the calculation result correcting parameter corresponding to the first etching apparatus 110 in the dividend in Equation 1, substitutes "−0.0026" as the calculation result correcting parameter corresponding to the material (in this example, the second material) that constructs the second pole portion 2b, substitutes "0.0012" as the calculation result correcting parameter corresponding to the measurement position (in this example, the second position) where the length L1 was measured, and substitutes "0.00072 (=0.0024×0.3)" as the calculation result correcting parameter corresponding to the difference in worked shape. The control unit 108 substitutes "0.082" as the "trim amount" (length L1-length L2). In addition, the control unit 108 carries out the calculation process by substituting "0.00000" as a calculation result correcting parameter corresponding to the first etching apparatus 110 in the divisor in Equation 1. By doing so, in the present example, the processing time is calculated at 94.92 seconds.

Figure 4:
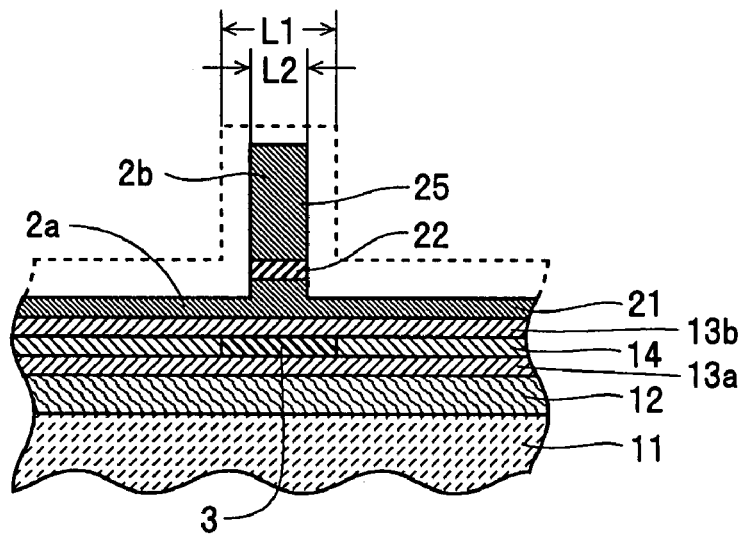
FIG. 4 is a cross-sectional view showing a state where the second pole portion has been narrowed by an etching process.

Next, the object to be etched 10 whose length L1 has been measured by the measuring apparatus 120 is set (on the table 102a) inside the vacuum chamber 102 of the first etching apparatus 110 and the etching process is started. When doing so, after first outputting the control signal S3 to the vacuum pump 103 to have the air discharged from the vacuum chamber 102, the control unit 108 outputs the control signal S4 to the gas supplying unit 104 to have inert gas supplied inside the vacuum chamber 102. Next, the control unit 108 outputs the control signal S2 to the power supply unit 106 to apply a voltage with a predetermined value to the ion gun 105 (i.e., to the various parts of the ion source 105a and the grid electrode 105b). When doing so, in accordance with factors such as deterioration in the grid electrode 105b and the supply state of the commercial AC power supplied to the power supply unit 106, a current of 30.0 mA, for example, is supplied from the power supply unit 106. By doing so, the inert gas (in this example, argon) inside the vacuum chamber 102 is ionized and emitted to the object to be etched 10 to etch the surface of the object to be etched 10. On the other hand, the control unit 108 outputs the control signal S2 to the power supply unit 106 to stop applying the voltage at a point when the processing time calculated by the calculation process described above has elapsed (i.e., a point when 94.92 seconds has elapsed in the present example) from a point where the voltage starts being applied to the ion gun 105 (i.e., the point where the supplying of current starts). By doing so, etching of the object to be etched 10 inside the vacuum chamber 102 is completed and as shown in FIG. 4, the second pole portion 2b is worked from the length L1 to the length L2 that is the target length (in this example, 0.250 μm).

The control unit 108 adds 94.92 seconds to the total usage time of the grid electrode 105b and updates the calculation process data D, calculates the value of the current supplied to the grid electrode 105b based on the value of the voltage applied from the power supply unit 106 to the grid electrode 105b during the etching process described above and the resistance value of the grid electrode 105b and updates the calculation process data D with the calculation result (in this example, 30.0 mA) as the actual value of the current supplied to the grid electrode 105b. After this, the protective film 26 is formed on the objects to be etched 10 for which the etching process has been completed and by also carrying out a cutting out process for the objects to be etched 10 according to a predetermined procedure, the 10,000 thin-film magnetic heads 1 are completed.

As one example, when manufacturing thin-film magnetic heads where the target length of the part corresponding to the second pole portion 2b (i.e., the length corresponding to the length L2 in the example described above) is 0.174 μm, as shown in FIG. 6, the length of the second pole portion 2b greatly fluctuated between 0.167 μm to 0.183 μm when the thin-film magnetic heads were manufactured according to the conventional method of manufacturing a thin-film magnetic head (i.e., a method of manufacturing a thin-film magnetic head that calculates the etching processing time based on the etching rate during the most recent the etching process). On the other hand, when thin films were manufactured according to the method of manufacturing a thin-film magnetic head according to the present invention in the same way as the thin-film magnetic head 1 described above, by calculating the processing time using various types of calculation result correcting parameters to correct differences in the measurement environment that measures the length before working (a length corresponding to the length L1 in the example described above) and differences in the working environment that etches the object to be etched 10, the length of the second pole portion 2b is limited to a range of 0.168 μm to 0.179 μm with sufficiently reduced fluctuation.

In this way, according to the magnetic head manufacturing system 100, the etching apparatus 110, and the method of manufacturing the thin-film magnetic head 1 using the etching apparatus 110, the calculation process for calculating the processing time required to work the second pole portion 2b to the target length is carried out based on the first calculation result correcting parameter that is obtained in advance corresponding to the measuring apparatus 120, the second calculation result correcting parameter that is obtained in advance corresponding to the position of the part to be worked (i.e., the position at which the second pole portion 2b is formed), the third calculation result correcting parameter that is obtained in advance corresponding to the value of the current supplied to the grid electrode 105b during the etching process, the fourth calculation result correcting parameter that is obtained in advance corresponding to the total usage time of the grid electrode 105b, the length before working (the length L1) and the target length (the length L2), and the thin-film magnetic head 1 is manufactured by carrying out the etching process on the object to be etched 10 for the calculated processing time.

This means that according to the magnetic head manufacturing system 100, the etching apparatus 110, and the method of manufacturing the thin-film magnetic head 1 using the etching apparatus 110, unlike the conventional method of manufacturing a thin-film magnetic head that calculates the processing time required to work the second pole portion to the target length based on the etching rate during the most recent etching process, it is possible to carry out an etching process on the object to be etched 10 by calculating a suitable processing time in accordance with changes in the working environment due to differences in the total usage time of the grid electrode 105b, changes in the working environment due to fluctuations in the supply state of the commercial AC power supplied to the etching apparatus 110 (the power supply unit 106), and the like. As a result, according to the magnetic head manufacturing system 100, the etching apparatus 110, and the method of manufacturing the thin-film magnetic head 1 using the etching apparatus 110, it is possible to manufacture the thin-film magnetic head 1 including a second pole portion 2b whose length L2 is subject to significantly less fluctuation.

Also, according to the magnetic head manufacturing system 100, the etching apparatus 110, and the method of manufacturing the thin-film magnetic head 1 using the etching apparatus 110, during the calculation process, the processing time is calculated using a first calculation result correcting parameter corresponding to a predetermined measuring apparatus 120 (in this example, the first apparatus) out of the plurality of first calculation result correcting parameters obtained in advance for a plurality of measuring apparatuses 120 (in this example, for four measuring apparatuses 120). Therefore, according to the magnetic head manufacturing system 100, the etching apparatus 110, and the method of manufacturing the thin-film magnetic head 1 using the etching apparatus 110, when the measuring process for the present invention is carried out in parallel using a plurality of measuring apparatuses 120, it is possible to correct errors in the calculation results due to measurement errors for the respective measuring apparatuses 120. Accordingly, an appropriate processing time can be calculated. Therefore, according to the magnetic head manufacturing system 100, the etching apparatus 110, and the method of manufacturing the thin-film magnetic head 1 using the etching apparatus 110, compared to a construction and method where the length L1 is successively measured for a plurality of objects to be etched 10 using a single measuring apparatus 120, it is possible to avoid a situation where there is a drop in the productivity due to the measuring process for the length L1 forming a bottleneck in the series of manufacturing processes and possible to manufacture a thin-film magnetic head 1 including a second pole portion 2b whose length L2 is subject to significantly less fluctuation regardless of which measuring apparatus 120 measured the length L1.

Also, according to the etching apparatus 110 and the method of manufacturing the thin-film magnetic head 1 using the etching apparatus 110, during the calculation process, the processing time is calculated using the second calculation result correcting parameter corresponding to a predetermined part to be worked (in this example, the second position) out of the plurality of second calculation result correcting parameters obtained in advance for a plurality of parts to be worked (in this example, for two standard positions). Therefore, according to the etching apparatus 110 and the method of manufacturing the thin-film magnetic head 1 using the etching apparatus 110, unlike the case where only one standard position for measuring the length L1 is set for each object to be etched 10, even if the length L1 at the first position is difficult to measure and the length L1 is measured at another measurement position (the second position), it will still be possible to carry out the etching process on the object to be etched 10 having calculated an appropriate processing time in accordance with fluctuations in the measured value due to differences in the measurement position. As a result, according to the etching apparatus 110 and the method of manufacturing the thin-film magnetic head 1 using the etching apparatus 110, it is possible to manufacture a thin-film magnetic head 1 with a second pole portion 2b whose length L2 is subject to significantly less fluctuation.

Also, according to the etching apparatus 110 and the method of manufacturing the thin-film magnetic head 1 using the etching apparatus 110, during the calculation process, the processing time is calculated using the fifth calculation result correcting parameter corresponding to a predetermined material (in this example, the first material) that forms the second pole portion 2b out of a plurality of fifth calculation result correcting parameters obtained in advance for a plurality of types of material (in this example, two types of material). Therefore, according to the etching apparatus 110 and the method of manufacturing the thin-film magnetic head 1 using the etching apparatus 110, even when a plurality of the predetermined materials described above are present, it will be possible to carry out an etching process on the object to be etched 10 having calculated the appropriate processing time for each material. As a result, according to the etching apparatus 110 and the method of manufacturing the thin-film magnetic head 1 using the etching apparatus 110, it is possible to manufacture various types of thin-film magnetic heads 1 of different materials where the second pole portion 2b is formed with a length L2 subject to significantly less fluctuation.

In addition, according to the etching apparatus 110 and the method of manufacturing the thin-film magnetic head 1 using the etching apparatus 110, during the calculation process, the processing time is calculated using a sixth calculation result correcting parameter corresponding to a predetermined worked shape (in this example, where the length L3 is 0.3 μm) for the part to be worked out of a plurality of sixth calculation result correcting parameters obtained in advance for a plurality of types of worked shapes. Therefore, according to the etching apparatus 110 and the method of manufacturing the thin-film magnetic head 1 using the etching apparatus 110, it is possible to carry out the etching process on the object to be etched 10 having calculated the appropriate processing time for the worked shape, even when there are a plurality of types of worked shapes. As a result, according to the etching apparatus 110 and the method of manufacturing the thin-film magnetic head 1 using the etching apparatus 110, it is possible to manufacture various types of thin-film magnetic head 1 with second pole portions 2b of different shapes but where the second pole portion 2b is formed with a length L2 that is subject to significantly less fluctuation.

In addition, according to the etching apparatus 110 and the method of manufacturing the thin-film magnetic head 1 using the etching apparatus 110, the control unit 108 updates the calculation process data D every time the etching process is completed in accordance with the processing content of the etching process. Therefore, according to the etching apparatus 110 and the method of manufacturing the thin-film magnetic head 1 using the etching apparatus 110, since it is possible to calculate the processing time based on calculation result correcting parameters that are constantly updated, it is possible to manufacture a thin-film magnetic head 1 including a second pole portion 2b whose length L2 is subject to significantly less fluctuation.

Note that the present invention is not limited to the construction and method described above. For example, although an example where the method of manufacturing a thin-film magnetic head according to the present invention is applied when forming the second pole portion 2b, the part worked according to the method of manufacturing a thin-film magnetic head according to the present invention is not limited to the second pole portion 2b and it is possible to apply the method of manufacturing a thin-film magnetic head according to the present invention when carrying out an etching process on various types of part to be worked, such as the first pole portion 2a, where high working precision is required.

What is claimed is:

1. A method of manufacturing a thin-film magnetic head that works a part to be worked of an object to be worked to a target length by carrying out an etching process on the part to be worked using an etching apparatus, the method of manufacturing comprising:
a measuring process that measures a length before working of a part to be worked using a measuring apparatus; and
a calculation process that calculates a processing time of the etching process required to work the part to be worked from a length before working to the target length based on a first calculation result correcting parameter obtained in advance corresponding to the measuring apparatus, a second calculation result correcting parameter obtained in advance corresponding to a position of the part to be worked, a third calculation result correcting parameter obtained in advance corresponding to a value of a current supplied to an electrode of the etching apparatus during the etching process, a fourth calculation result correcting parameter obtained in advance corresponding to a total usage time of the electrode, the length before working, and the target length,
wherein the etching process is carried out on the part to be worked of the object to be worked for the calculated processing time.

2. A method of manufacturing a thin-film magnetic head according to claim 1, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

3. A method of manufacturing a thin-film magnetic head according to claim 1, wherein when the part to be worked has been formed of a predetermined material out of a plurality of types of material, the processing time is calculated during the calculation process using a fifth calculation result correcting parameter corresponding to the predetermined material out of a plurality of the fifth calculation result correcting parameters that are obtained in advance for the plurality of types of material.

4. A method of manufacturing a thin-film magnetic head according to claim 3, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

5. A method of manufacturing a thin-film magnetic head according to claim 1, wherein when the length before working has been measured during the measuring process for a predetermined part to be worked out of a plurality of the parts to be worked, the processing time is calculated during the calculation process using a second calculation result correcting parameter corresponding to the predetermined part to be worked out of a plurality of the second calculation result correcting parameters that are obtained in advance for the plurality of the parts to be worked.

6. A method of manufacturing a thin-film magnetic head according to claim 5, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

7. A method of manufacturing a thin-film magnetic head according to claim 5, wherein when the part to be worked has been formed of a predetermined material out of a plurality of types of material, the processing time is calculated during the calculation process using a fifth calculation result correcting parameter corresponding to the predetermined material out of a plurality of the fifth calculation result correcting parameters that are obtained in advance for the plurality of types of material.

8. A method of manufacturing a thin-film magnetic head according to claim 7, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

9. A method of manufacturing a thin-film magnetic head according to claim 1, wherein when the length before working has been measured during the measuring process using a predetermined measuring apparatus out of a plurality of the measuring apparatuses, the processing time is calculated during the calculation process using a first calculation result correcting parameter corresponding to the predetermined measuring apparatus out of a plurality of the first calculation result correcting parameters that are obtained in advance for the plurality of the measuring apparatuses.

10. A method of manufacturing a thin-film magnetic head according to claim 9, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

11. A method of manufacturing a thin-film magnetic head according to claim 9, wherein when the part to be worked has been formed of a predetermined material out of a plurality of types of material, the processing time is calculated during the calculation process using a fifth calculation result correcting parameter corresponding to the predetermined material out of a plurality of the fifth calculation result correcting parameters that are obtained in advance for the plurality of types of material.

12. A method of manufacturing a thin-film magnetic head according to claim 11, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

13. A method of manufacturing a thin-film magnetic head according to claim 9, wherein when the length before working has been measured during the measuring process for a predetermined part to be worked out of a plurality of the parts to be worked, the processing time is calculated during the calculation process using a second calculation result correcting parameter corresponding to the predetermined part to be worked out of a plurality of the second calculation result correcting parameters that are obtained in advance for the plurality of the parts to be worked.

14. A method of manufacturing a thin-film magnetic head according to claim 13, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

15. A method of manufacturing a thin-film magnetic head according to claim 13, wherein when the part to be worked has been formed of a predetermined material out of a plurality of types of material, the processing time is calculated during the calculation process using a fifth calculation result correcting parameter corresponding to the predetermined material out of a plurality of the fifth calculation result correcting parameters that are obtained in advance for the plurality of types of material.

16. A method of manufacturing a thin-film magnetic head according to claim 15, wherein when the part to be worked is worked to a predetermined worked shape out of a plurality of types of worked shape during the etching process, the processing time is calculated during the calculation process using a sixth calculation result correcting parameter corresponding to the predetermined worked shape out of a plurality of the sixth calculation result correcting parameters that are obtained in advance for the plurality of types of worked shape.

* * * * *